United States Patent
Nagendra et al.

(10) Patent No.: US 12,524,632 B2
(45) Date of Patent: Jan. 13, 2026

(54) INVENTORY TRACKING

(71) Applicant: SATO HOLDINGS KABUSHIKI KAISHA, Tokyo (JP)

(72) Inventors: Ganesh Nagendra, St Peters (AU); Graham Murdoch, St Peters (AU); George Rezk, St. Peters (AU)

(73) Assignee: Sato Corporation, Tokyo (JP)

( * ) Notice: Subject to any disclaimer, the term of this patent is extended or adjusted under 35 U.S.C. 154(b) by 0 days.

(21) Appl. No.: 18/838,910

(22) PCT Filed: Feb. 18, 2022

(86) PCT No.: PCT/IB2022/051449
§ 371 (c)(1),
(2) Date: Aug. 15, 2024

(87) PCT Pub. No.: WO2023/156823
PCT Pub. Date: Aug. 24, 2023

(65) Prior Publication Data
US 2025/0148227 A1    May 8, 2025

(51) Int. Cl.
*G06K 7/10* (2006.01)
*H01F 7/06* (2006.01)

(52) U.S. Cl.
CPC ............ *G06K 7/10297* (2013.01); *H01F 7/06* (2013.01)

(58) Field of Classification Search
CPC ... G06K 7/10297; G06K 7/10336; H01F 7/06
See application file for complete search history.

(56) References Cited

U.S. PATENT DOCUMENTS

| | | | | |
|---|---|---|---|---|
| 7,638,100 B2 * | 12/2009 | Dawes | ........... | A61M 1/025 |
| | | | | 422/536 |
| 2009/0225626 A1 * | 9/2009 | Baumfalk | ........... | B01F 31/22 |
| | | | | 366/151.2 |
| 2011/0202170 A1 * | 8/2011 | Dawes | ........... | G16H 40/67 |
| | | | | 700/214 |

(Continued)

FOREIGN PATENT DOCUMENTS

| | | | | |
|---|---|---|---|---|
| FR | 3064118 B1 * | 3/2019 | ........... | H01Q 3/12 |
| WO | 2017/141164 A1 | 8/2017 | | |
| WO | 2022/029609 A1 | 2/2022 | | |

OTHER PUBLICATIONS

International Search Report dated Oct. 6, 2022, issued in counterpart International application No. PCT/IB2022/051449. (3 pages).

*Primary Examiner* — Sonji N Johnson
(74) *Attorney, Agent, or Firm* — WHDA, LLP

(57) ABSTRACT

An inventory tracking system (100) for use with an agitator (200) comprises an RFID antenna system (102) for detecting RFID tags located in the agitator and an RFID reader (104) in communication with the RFID antenna system (102). The inventory tracking system (100) also comprises a sensor system (106) configured to monitor a state of the agitator. The RFID reader (104) receives a signal indicative of an agitator state from the sensor system (106), and the RFID reader (104) controls operation of the RFID antenna system (102) responsive to said received signal. The sensor system may be configured to monitor motion of the agitator, for example the signal received by the RFID reader may be indicative of the agitator starting or restarting motion.

11 Claims, 4 Drawing Sheets

(56) References Cited

U.S. PATENT DOCUMENTS

2015/0028997 A1   1/2015  Phillips et al.
2015/0103621 A1*  4/2015  Santrach ................. B01F 23/50
                                              366/214

* cited by examiner

INVENTORY TRACKING

TECHNICAL FIELD

The present disclosure relates, generally, to an inventory tracking system and, more particularly, to an inventory tracking system for use with an agitator or incubator, and a method of tracking inventory in an agitator or incubator.

BACKGROUND

In blood banks, agitators such as a Helmer PF96 are used to store platelet bags. These agitators have multiple sliding or removable shelves that can store several bags horizontally.

To ensure that the platelets are continuously oxygenated (i.e., sufficient oxygen can enter the bag and excess carbon dioxide can be expelled), agitation of the platelet components is required. Consequently, the agitator is capable of moving the entire compartment laterally by a certain positive (+x) and negative (−x) displacement. In normal operation, the agitator compartment is constantly moving between the positive and negative displacement positions at a controllable and adjustable speed. When a user wants to add or remove platelet bags, then they can stop the motion via a switch and access the shelves.

An incubator, such as the Helmer PC4200i, is a temperature controlled agitator. Incubators allow the temperature of the platelet bags to be controlled and monitored precisely, as well as ensure the bags are in constant motion.

Radio-frequency identification (RFID) tracking of the contents in an agitator or an incubator involves incorporating RFID antennas into the agitator or incubator, for example into the shelving or doors, as well as adding RFID tags to the platelet bags.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

An RFID reader can start a scan of the contents of the agitator (or incubator) and update inventory management software of the change in contents after a user has accessed the shelves of the agitator to either add or remove platelet bags. The agitator has to stop or be stationary for any addition or removal of stock because opening or closing drawers and adding or removing bags is quite difficult (and can cause damage to the bags) when the unit is moving. Therefore, it would be useful to be able to detect when a user has accessed the shelves of the agitator to add or remove platelet bags.

It would also be useful to be able to detect when a user has accessed the shelves in a manner that does not change the design of the agitator, and does not require any mechanical modification to the agitator. This is so that an RFID inventory system can be retrofitted to existing agitators, to a variety of different agitator models, and also in a simple (and therefore typically cost-effective) way.

In one aspect there is provided an inventory tracking system for use with an agitator, the system comprising: an RFID antenna system for detecting RFID tags located in the agitator; an RFID reader in communication with the RFID antenna system; and a sensor system configured to monitor a state of the agitator, wherein the RFID reader receives a signal indicative of an agitator state from the sensor system, and wherein the RFID reader controls operation of the RFID antenna system responsive to said received signal.

The sensor system may be configured to monitor motion of the agitator. The signal received by the RFID reader may be indicative of the agitator starting or restarting motion.

The sensor system may comprise: a sensor module having at least one sensor; and a processing circuit configured to process an output signal of the sensor module, and to provide a processed signal to the RFID reader, the processed signal being said received signal indicative of the agitator state.

The output signal of the sensor module may be indicative of a position of a compartment of the agitator relative to a base of the agitator. The processed signal output by the processing circuit may be indicative of the agitator being in motion or stationary.

The processing circuit may comprise a discriminator circuit. The discriminator circuit may comprise a monostable circuit.

The output signal of the sensor module may comprise a pulse having a pulse period while the agitator is in motion. The processing circuit may determine the agitator state responsive to the pulse period.

The sensor module may comprise a proximity sensor module. The proximity sensor module may comprise a magnetic field sensor and a magnetic actuator. The magnetic actuator may be positioned in or on the agitator so as to be aligned with the magnetic field sensor when the agitator is in a stationary position.

In another aspect there is provided a method of tracking inventory in an agitator, the method comprising, at an RFID reader: receiving a sensor signal indicative of an agitator state; responsive to the received signal, activating an RFID antenna system at the agitator; receiving a response signal from the RFID antenna system; and determining an inventory of the agitator based on the response signal.

The agitator state may comprise a moving or stationary state.

The received signal may be indicative of the agitator starting or restarting motion.

These and other aspects and features will now become apparent to those skilled in the art upon review of the following description of specific non-limiting embodiments in conjunction with the accompanying drawings.

BRIEF DESCRIPTION OF DRAWINGS

The detailed description of illustrative (non-limiting) embodiments will be more fully appreciated when taken in conjunction with the accompanying drawings in which.

Figure 1:
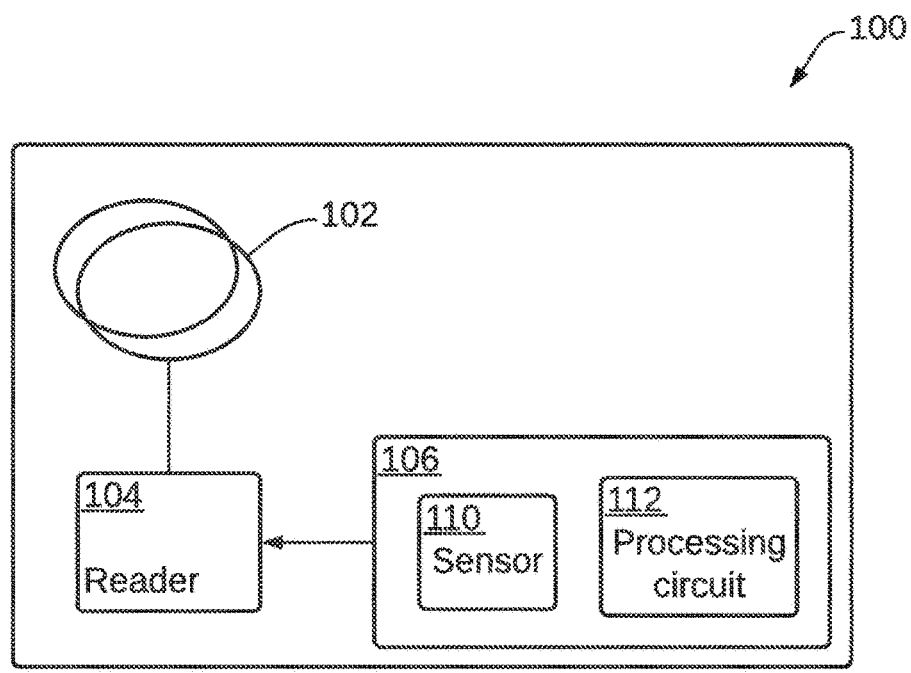
FIG. 1 is a schematic representation of a non-limiting embodiment of an inventory tracking system.

The drawings are not necessarily to scale and may be illustrated by phantom lines, diagrammatic representations and fragmentary views. In certain instances, details that are not necessary for an understanding of the embodiments or that render other details difficult to perceive may have been omitted.

In the drawings, like reference numerals designate similar parts.

DESCRIPTION

Reference will now be made in detail to various non-limiting embodiments of methods and systems for tracking inventory in an agitator. It should be understood that other non-limiting embodiments, modifications and equivalents will be evident to one of ordinary skill in the art in view of the non-limiting embodiments disclosed herein and that these variants should be considered to be within scope of the appended claims.

Furthermore, it will be recognized by one of ordinary skill in the art that certain structural and operational details of the non-limiting embodiments discussed hereafter may be modified or omitted altogether (i.e., such features may be considered non-essential). In other instances, well known methods, procedures, and components have not been described in detail.

FIG. 1 of the drawings shows an inventory tracking system 100 for use with an agitator. The system 100 comprises an RFID antenna system 102 for detecting RFID tags located in the agitator, and an RFID reader 104 in communication with the RFID antenna system 102. The inventory tracking system also has a sensor system 106 configured to monitor a state (for example position and/or motion) of the agitator. The RFID reader 104 receives a signal indicative of the agitator starting or restarting motion from the sensor system 106, and the RFID reader 104 controls operation of the RFID antenna system 102 responsive to the signal received from the sensor system 106. The sensor system 106 includes a sensor module 110 and a processing circuit 112. The processing circuit 112 converts the signals from the sensor module 110 to an output that is in a form that can be used by the RFID reader 104, as described in more detail elsewhere herein.

Figure 2A:
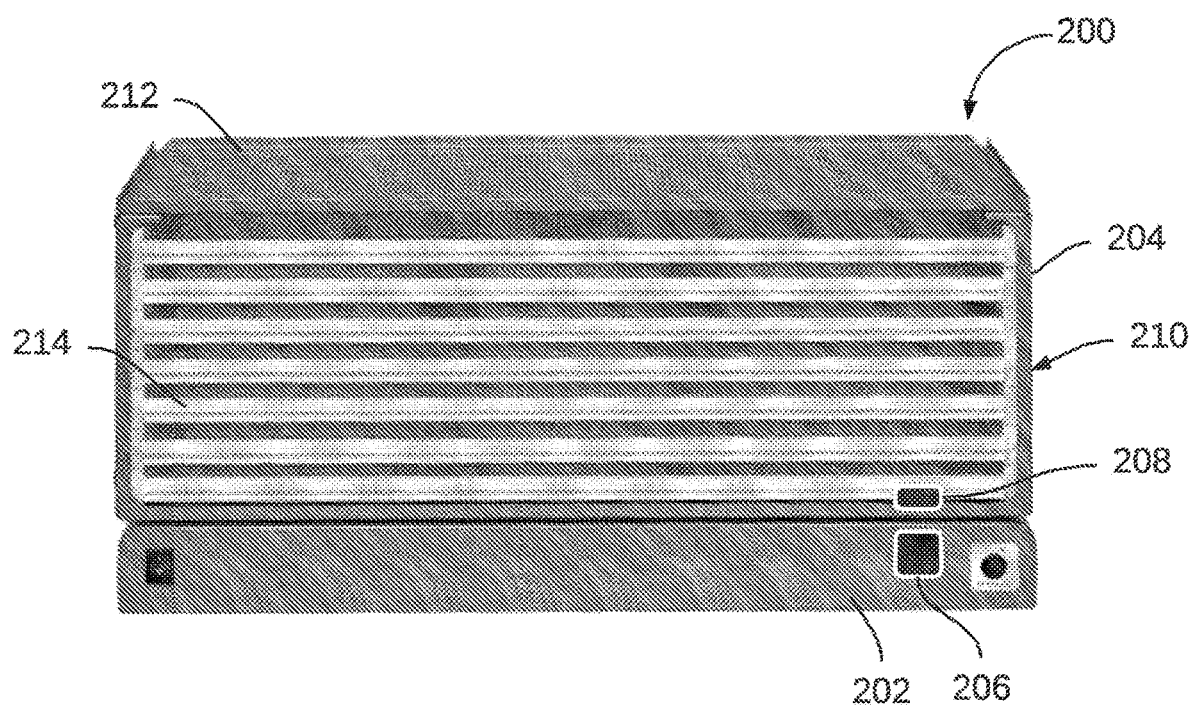
FIG. 2A is an actuator incorporating the inventory tracking system of FIG. 1 having a first embodiment of a sensor system.

In one non-limiting embodiment, the sensor module 110 includes a magnetic proximity sensor module that is attached to or otherwise associated with the agitator 200 as illustrated in FIG. 2A of the drawings. The agitator has an external body 210, typically made from a ferromagnetic material such as iron or steel. The agitator has an agitator base 202 that is stationary and an agitator compartment 204 (having a frame 212 and one or more drawers 214) that is movable relative to the agitator base 202. The sensor module 110 includes a sensor 206, such as a reed switch or Hall Effect sensor that is capable of detecting a magnetic field (for example a Hamlin 59105 Terminal Flange Sensor), and an actuator 208 that includes a magnet (for example a Hamlin 57105 Magnetic Actuator).

Other forms of proximity sensors may also be used, for example capacitive sensor, photoelectric sensors, optical sensors, etc.

In the non-limiting embodiment illustrated in FIG. 2A, the sensor 206 is mounted to the stationary base 202 of the agitator 200, while the actuator 208 is mounted to the moving compartment that comprises the agitator compartment 204. In other embodiments these components may be positioned in or on the agitator vice versa, e.g., the sensor may be affixed to the compartment while the actuator is affixed to the base. When the sensor 206 and actuator 208 are in close proximity, then the sensor output changes state.

The sensor module 110 may be mounted to the agitator 200 using, for example, one of the following means:

(1) Connecting a custom fabricated mounting plate to existing screw holes on the external agitator body 210;

(2) Applying double sided tape on both the sensor 206 and the actuator 208, and adhering the sensor and actuator to the agitator body 210;

(3) Applying a magnetic strip with an adhesive backing to the sensor 206 and the actuator 208, and magnetically attaching the sensor and actuator to the agitator body 210 that is made from a ferromagnetic material such as iron or steel (this option allows the sensor and/or actuator to be repositioned).

Figure 2B:
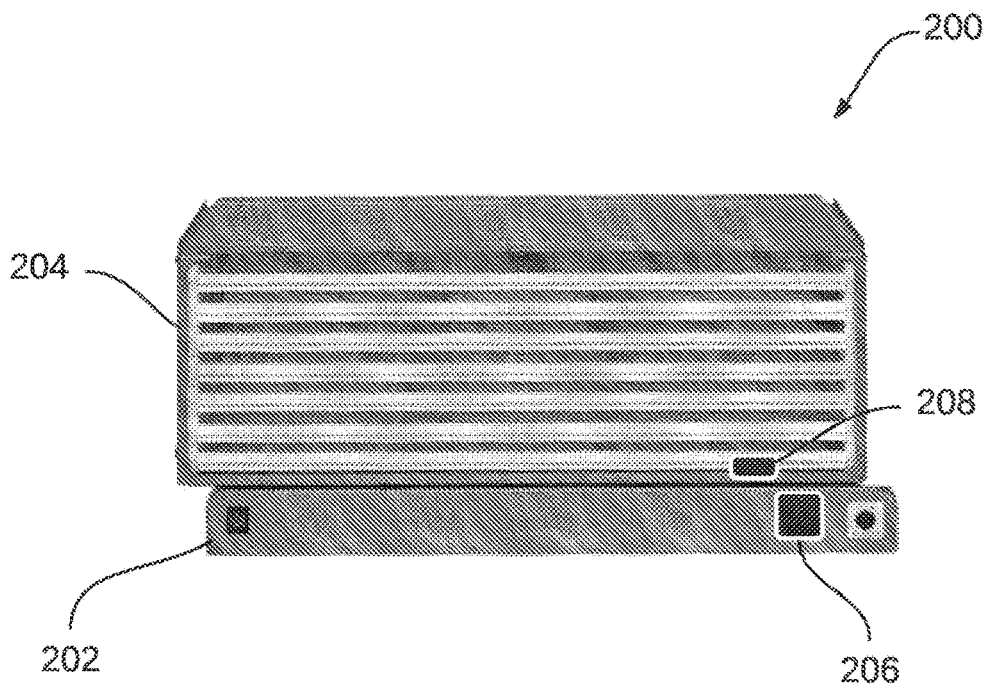
FIG. 2B illustrates displacement of the agitator compartment relative to the agitator base for the actuator of FIG. 2A.
Figure 3:
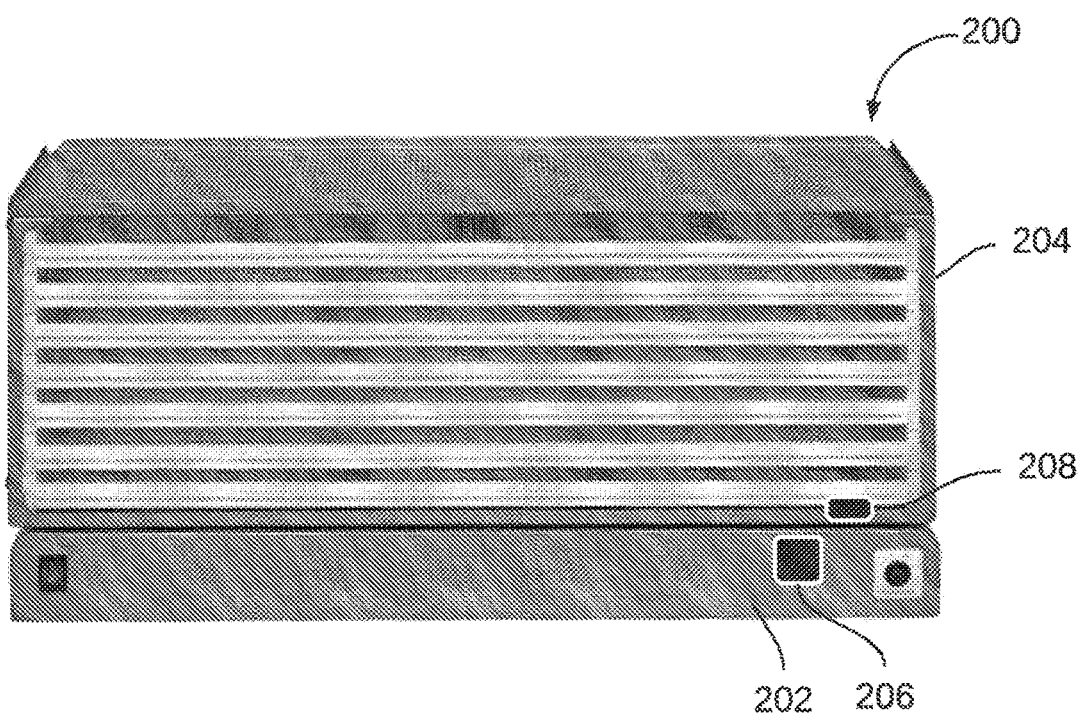
FIG. 3 illustrates the relative position of a sensor and actuator of a second embodiment of a sensor system.

The sensor system 106 is configured to provide at least two output states. The first sensor output state is associated with the agitator compartment 204 being aligned with the base 202 (this position is illustrated in FIG. 2A and FIG. 2B). This state will occur when the agitator is in a resting position when motion stops. The second sensor output state is associated with the agitator compartment 204 being misaligned with the base 202 (this position is illustrated in FIG. 3). In some non-limiting embodiments, the output states are different output impedances (high or low). In other non-limiting embodiments, the output states are different digital driven outputs (logical '1' or '0').

For the exemplary embodiment using a magnetic sensor, the sensor system 106 is configured to monitor motion and the sensor module 110 is configured to monitor position. The sensor 206 has a low output impedance when the agitator compartment is aligned with the agitator base, and the sensor 206 has a high output impedance when the compartment and base are misaligned. This means that when the agitator compartment is moving with a period of $T_A$, the sensor output will toggle between its two output states with a period of $T_S$ that is given by:

$$T_S = \frac{T_A}{N} \qquad \text{Eq. 1}$$

Here N is the number of times the sensor is triggered each cycle of agitator motion. If the sensor 206 and actuator 208 are aligned when the agitator is in a central resting position as illustrated in FIGS. 2A and 2B of the drawings, then N=2. In the non-limiting embodiment illustrated in FIG. 3, the sensor 206 and actuator 208 are positioned to be misaligned when the agitator is in a central resting position, and then N=1.

Figure 4:
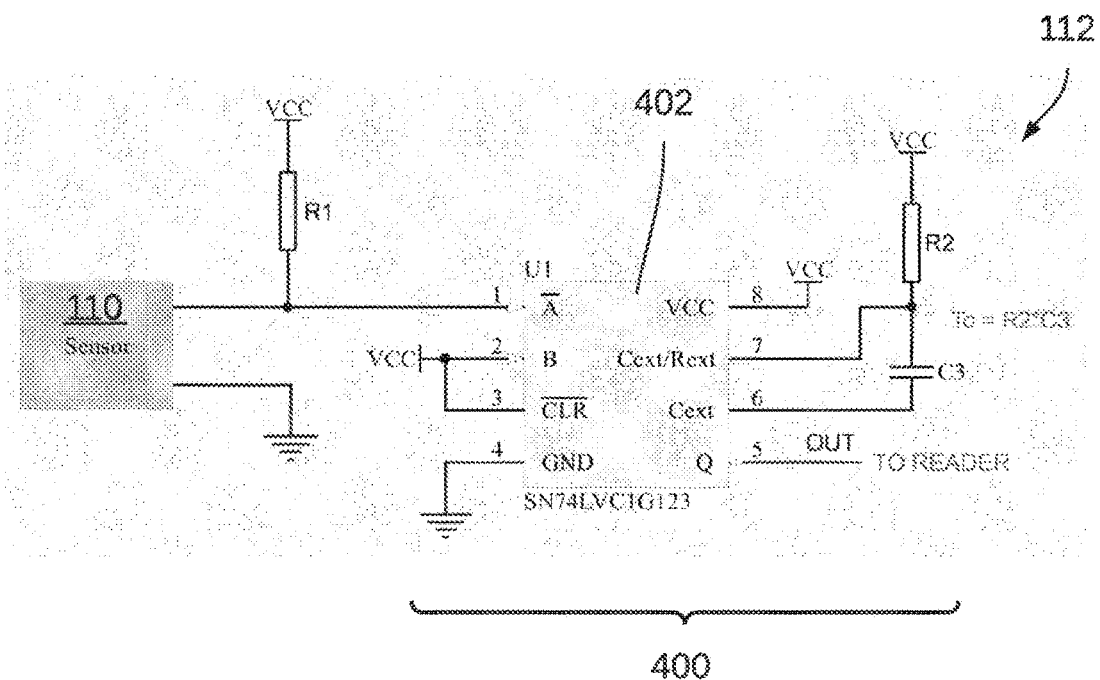
FIG. 4 is a circuit diagram of a non-limiting embodiment of a processing circuit that forms part of the inventory tracking system of FIG. 1.

FIG. 4 of the drawings shows a circuit diagram of a non-limiting embodiment of the processing circuit 112 that forms part of the sensor system 106. The processing circuit 112 may have a pull-up resistor R1 to convert the high or low output impedance to a high or low output voltage. Note that in embodiments where the sensor output is a driven output, then the pull-up resistor is not needed.

The output voltage is fed as the input to a discriminator circuit 400, in this example in the form of a retriggerable monostable multivibrator circuit that uses an integrated circuit (IC) 402. An example IC is the SN74LVC1G123 manufactured by Texas Instruments. The IC 402 may have one or more of the following features:

(1) It can be either setup as a positive or negative edge triggered mono-stable;
(2) It has an asynchronous clear input signal to reset the output;
(3) It has an adjustable output pulse duration using an external capacitor C3 and resistor R2;
(4) It has Schmitt trigger inputs with sufficient hysteresis to handle slow input transition rates with jitter free triggering at the output.

As an example, the IC 402 is set up as negative edge triggered, with the sensor module 110 placed on the agitator 200 as illustrated in FIG. 2A of the drawings. The sensor module 110 output is connected to a pull-up resistor R1 and the negative edge sensitive input $\overline{A}$. The positive edge sensitive input B is unused, together with the clear $\overline{CLR}$, and so they are connected to the power source Vcc. The output pulse duration is set by resistor R2 and capacitor C3 and can be adjusted to suit the application. The output Q is a signal that can be fed to the RFID reader 104.

Figure 5:
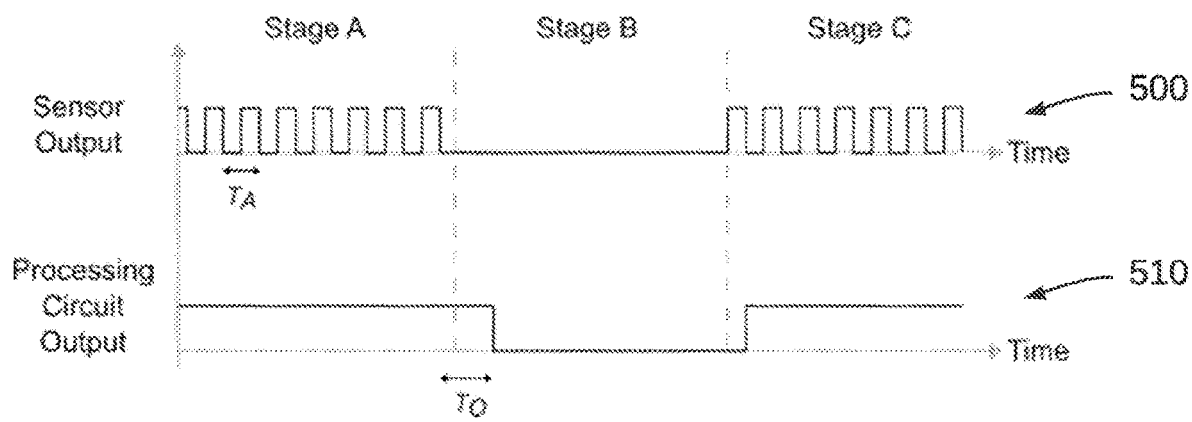
FIG. 5 is a timing diagram of input and output signals associated with the circuit diagram of FIG. 4.

The expected waveform 500 from the sensor module 110 and the expected waveform 510 from the discriminator circuit 400 of the processing circuit 112 output Q are illustrated in FIG. 5. In stage A, the agitator is moving at a frequency of $f_A$. The sensor output is a pulse that varies between a high and low impedance with a pulse period given by $T_A$. The monostable circuit 400 is set up with an output pulse duration that is longer than this period. This means that every falling edge of the sensor output signal causes the monostable IC 402 to be retriggered, and consequently, the output 510 of the monostable circuit 400 is kept high.

In stage B, the agitator is stopped by the user. The sensor output will either be a high impedance or low impedance depending on where exactly the agitator stops its motion. Regardless, there will be no falling edge of the sensor output signal. Consequently, after the output pulse duration ($T_O$) of the monostable has elapsed, the output will go low.

In stage C, the user has restarted the agitator (for example after adding or removing platelet bags), so the agitator is moving once again. The operation is very similar to stage A, and so the output of the monostable goes high once again when it detects the first falling edge of the sensor output.

As the speed of the agitator is variable from $T_{A-MIN}$ to $T_{A-MAX}$, the output pulse duration ($T_O$) should be set so that:

$$T_O > \frac{T_{A-MAX}}{N} \quad \text{Eq. 2}$$

In this way, the discriminator circuit provides the RFID reader with a signal indicative of a change in state in the form of a change in motion, for example indicative of the agitator starting or restarting motion. The discriminator generates this signal responsive to the pulse period output from the sensor module 110 (i.e., as provided by the sensor 206).

The output of the monostable circuit 400 can be fed directly to an available GPIO (General Purpose Input/Output) input pin on the RFID reader 104. In some non-limiting embodiments, the RFID reader 104 polls the GPIO pin to see if the monostable output is high or not to determine if the agitator is moving or stationary. In other non-limiting embodiments, a software interrupt is configured to interrupt the reader CPU when this pin changes state. Advantageously the latter approach minimizes CPU resources and time compared to the polling approach.

Figure 6:
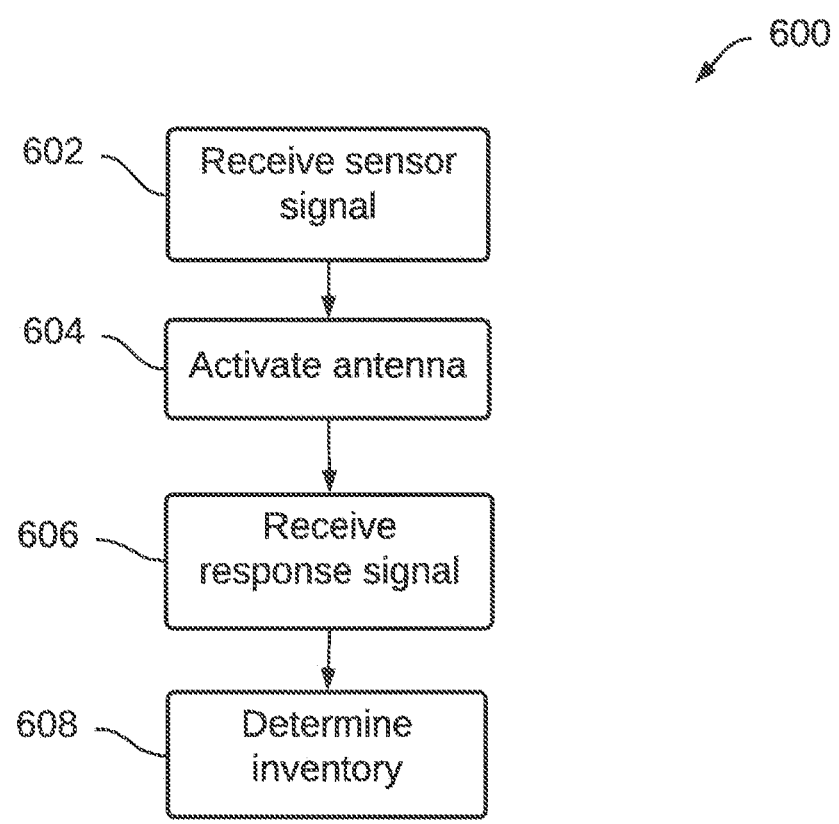
FIG. 6 is a flow diagram of a method of tracking inventory in an agitator.

FIG. 6 of the drawings shows a flow diagram of a method 600 of tracking inventory in an agitator. The method comprises, at an RFID reader, receiving 602 a sensor signal indicative of an agitator state (e.g., a moving or stationary state), and responsive to the received signal, and then activating 604 an RFID antenna system at the agitator. The method further comprises receiving 606 a response signal from the RFID antenna system, and determining 608 an inventory of the agitator based on the response signal. The received signal may be indicative of the agitator starting or restarting motion.

The system described herein is able to alert the RFID reader when the agitator has stopped and when the agitator is moving. Advantageously, this can trigger a scan of the contents to determine if tagged items were added or removed.

Advantageously, the sensor system can be applied to the agitator with minimal change (if any) required in the design of the agitator.

Advantageously, the system described herein can easily be adapted for different agitator models with different agitation speeds.

Advantageously, as an edge triggered monostable is being used, the circuit can detect when the unit stops, regardless of whether the agitator stops in a position of high or low sensor output impedance. This is because the change in sensor output impedance is being detected.

It is noted that the foregoing has outlined some of the more pertinent non-limiting embodiments. It will be clear to those skilled in the art that modifications to the disclosed non-embodiment can be effected without departing from the spirit and scope thereof. As such, the described non-limiting embodiment ought to be considered to be merely illustrative of some of the more prominent features and applications. Other beneficial results can be realized by applying the non-limiting embodiments in a different manner or modifying them in ways known to those familiar with the art. This includes the mixing and matching of features. Elements and/or functions between various non-limiting embodiment(s) is expressly contemplated herein so that one of ordinary skill in the art would appreciate from this disclosure that features, elements and/or functions of one embodiment may be incorporated into another embodiment as appropriate, unless described otherwise, above. Although the description is made for particular arrangements and methods, the intent and concept thereof may be suitable and applicable to other arrangements and applications.

In the claims which follow and in the preceding description, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments.

The invention claimed is:

1. An inventory tracking system for use with an agitator, the system comprising:
   an RFID antenna system for detecting RFID tags located in the agitator;
   an RFID reader in communication with the RFID antenna system; and
   a sensor system configured to monitor a state of the agitator, wherein the state is either a moving state or a stationary state,
   wherein the RFID reader receives a signal indicative of the agitator state from the sensor system, wherein the signal received by the RFID reader is indicative of the agitator starting or restarting motion, and wherein the RFID reader controls operation of the RFID antenna system responsive to said received signal when the agitator starts or restarts motion.

2. The inventory tracking system of claim 1, wherein the sensor system is configured to monitor motion of the agitator to determine when the agitator state is a moving state or a stationary state.

3. The inventory tracking system of claim 1, wherein the sensor system comprises:

a sensor module having at least one sensor; and a processing circuit configured to process an output signal of the sensor module, and to provide a processed signal to the RFID reader, the processed signal being said received signal indicative of the agitator starting or restarting.

4. The inventory tracking system of claim 3, wherein:

the output signal of the sensor module is indicative of a position of a compartment of the agitator relative to a base of the agitator; and the processed signal output by the processing circuit is indicative of the agitator being in motion or stationary.

5. The inventory tracking system of claim 3, wherein the processing circuit comprises a discriminator circuit.

6. The inventory tracking system of claim 5, wherein the discriminator circuit comprises a monostable circuit.

7. The inventory tracking system of claim 3, wherein:

the output signal of the sensor module comprises a pulse having a pulse period while the agitator is in motion; and the processing circuit determines the agitator state responsive to the pulse period.

8. The inventory tracking system of claim 3, wherein:

the sensor module comprises a proximity sensor module.

9. The inventory tracking system of claim 8, wherein:

the proximity sensor module comprises a magnetic field sensor and a magnetic actuator.

10. The inventory tracking system of claim 9, wherein:

the magnetic actuator is positioned in or on the agitator so as to be aligned with the magnetic field sensor when the agitator is in a stationary position.

11. A method of tracking inventory in an agitator, the method comprising, at an RFID reader:

receiving a sensor signal indicative of an agitator state, wherein the state is either a moving state or a stationary state, and wherein the received signal is indicative of the agitator starting or restarting motion;

responsive to the received signal, activating an RFID antenna system at the agitator to scan contents of the agitator when the agitator starts or restarts motion;

receiving a response signal from the RFID antenna system; and determining an inventory of the agitator based on the response signal.

* * * * *